| United States Patent [19] | [11] Patent Number: 4,965,307 |
| Okabe et al. | [45] Date of Patent: Oct. 23, 1990 |

[54] POLYESTER FILM

[75] Inventors: Kazuo Okabe; Katsumi Bokuta; Hiroyuki Morimoto, all of Shiga, Japan

[73] Assignee: Toray Industries, Inc., Tokyo, Japan

[21] Appl. No.: 283,327

[22] Filed: Dec. 7, 1988

[30] Foreign Application Priority Data

Apr. 7, 1987 [JP] Japan .................. 62-85494
Apr. 8, 1987 [JP] Japan .................. 62-87531
Jan. 28, 1988 [JP] Japan .................. 63-18139

[51] Int. Cl.$^5$ .............................................. C08J 5/18
[52] U.S. Cl. .................................... 524/425; 524/605
[58] Field of Search ............................... 524/425, 605

[56] References Cited

U.S. PATENT DOCUMENTS

| 3,884,870 | 5/1975 | Dodson et al. | 524/425 |
| 4,348,446 | 9/1982 | Mitsuishi et al. | 428/409 |
| 4,421,887 | 12/1983 | Horie et al. | 524/317 |
| 4,508,782 | 4/1985 | Miura et al. | 428/409 |
| 4,590,119 | 5/1986 | Kawakami et al. | 524/605 |
| 4,595,715 | 6/1986 | Kuze et al. | 428/338 |
| 4,670,319 | 6/1987 | Katoh et al. | 428/141 |
| 4,693,932 | 9/1987 | Kuze et al. | 524/425 |
| 4,767,657 | 8/1988 | Sakamoto et al. | 428/143 |

*Primary Examiner*—Lewis T. Jacobs
*Assistant Examiner*—Karen A. Hellender
*Attorney, Agent, or Firm*—Birch, Stewart, Kolasch & Birch

[57] ABSTRACT

Polyester films with a good slitting property and good slipping property contain, in first and second embodiments, at least 0.005% by weight of calcium carbonate particles. The particle size $S_c$ of the polyester crystals, crystal face orientation index $X_i$ and the difference $\Delta n$ between the refractive indices in the machine direction and in the transverse direction of the polyester film have a specific relationship, or the internal haze H, face orientation coefficient $f_n$ or the difference $\Delta n$ between the refractive indices in the machine direction and in the transverse direction have a specific relationship. By satisfying the specific relationship, a good slitting property and good slipping property are obtained. A third embodiment provides a polyester film containing at least 0.005% by weight of calcium carbonate particles, which has a specific center line average roughness Ra, face orientation coefficient $f_n$, the difference $\Delta n$ between the refractive indices in the machine direction and in the transverse direction, and F-5 value in the transverse direction. By these characteristics, a good slitting property, good slipping property and good shaving property are obtained.

30 Claims, 3 Drawing Sheets

POLYESTER FILM

TECHNICAL FIELD

This invention relates to a polyester film. More particularly, this invention relates to a polyester film with excellent slitting property and slipping property.

BACKGROUND ART

Polyester films represented by polyethylene terephthalate films are widely used in various fields such as the magnetic recording and electric equipment fields because they have excellent mechanical, thermal and electrical properties.

Among the application fields of polyester films, there are magnetic recording tapes and magnetic recording disks, for which smoothness and good slipping properties of the surface, as well as good shaving properties at the time of application of magnetic material are required. In cases where the polyester film is used as video tapes, since the tapes are manufactured by slitting a film to a width of ½ inch or 8 mm and the shape of the cut face is one of the important factors which determine the quality of the tape, the films are also required to have a good slitting property. More particularly, magnetic tapes are generally manufactured by drawing out a polyester film rolled on a spool while simultaneously applying a magnetic material to one surface thereof, drying the film to remove the solvent, calendering the resulting film to plane the applied magnetic material to mirror-like state, winding the resulting film on a spool and then slitting the film to a prescribed width. Conventionally, in the slitting step, whiskers are formed at the cut faces, which causes degradation of the performance of the products. For example, bad slitting properties may cause drop out or clogging of the head of the video tape recorder when the film is used as a magnetic tape.

In the calender step, the polyester films to which the magnetic material has been applied are passed between a rotating elastic roll and a rotating heated metal roll under a high nipping pressure, such that, in general, the surface to which the magnetic material is applied contacts the metal roll and the opposite polyester surface contacts the elastic roll. In this step, a plurality of alternately arranged elastic rolls and heated metal rolls are used. When the polyester film passes between the rolls, shaving of the film is performed because of the high shearing force exerted to the surface of the polyester film contacting the elastic roll. The higher the speed of the calender step, the more the abradings generated. The abradings produced in the calender step may be re-attached to the surface of the polyester film and then may be transferred to the surface to which the magnetic material is applied when the tape is rolled to cause dropout which is one of the serious defects of the electromagnetic conversion characteristics of magnetic tapes. Thus, it is important to reduce the production of the abradings. In other words, it is important to improve the shaving property of the film.

As to the improvement of the slipping property, for example, Japanese Patent Publication (Kokoku) No. 20496/80 discloses a polyester film containing both of the internal particles and inert incorporated particles. However, the polyester film disclosed in this reference does not have a satisfactory slitting property.

As a polyester film with an improved slitting property, for example, Japanese Patent Disclosure (Kokai) No. 11179/79 discloses a polyester film with a specific Young's modulus of elasticity in the machine direction and the transverse direction. Japanese Patent Disclosure (Kokai) No. 159619/82 discloses a polyester film with an improved slitting property, which has a specific relationship between the refractive index in the direction of thickness of the film and the intrinsic viscosity thereof. Further, Japanese Patent Disclosure (Kokai) No. 162126/82 discloses a polyester film with an improved slitting property, which has a specific relationship among the refractive index in the direction of thickness of the film, the refractive index of the film in the machine direction and transverse direction, and the intrinsic viscosity of the film. However, the polyester films disclosed in these references do not have a satisfactory slipping property.

As a polyester film with an improved shaving property, for example, Japanese Patent Disclosure (Kokai) No. 254328/86 discloses a polyester film in which the shaving property is improved by incorporating dispersed silicon oxide secondary particles composed of primary particles, which have a large inner surface area. However, the polyester film disclosed in this reference does not have a satisfactory slitting property.

Thus, heretofore, there is no polyester film which has both a good slitting property and good slipping property. Further, heretofore, there is no polyester film which has a good slitting property, good slipping property and good shaving property.

DISCLOSURE OF THE INVENTION

The object of the present invention is to provide a polyester film with a good slitting property and good slipping property. Another object of the invention is to provide a polyester film with a good slitting property, good slipping property and good shaving property.

That is, the present invention provides a polyester film containing as fine particles at least calcium carbonate particles in the amount of not less than 0.005% by weight, the particle size $S_c$ (nm) of the polyester crystals, the crystal face orientation index $X_i$ and the difference $\Delta n$ between the refractive indices in the machine direction and in the transverse direction satisfying the equation of $$5 \leq -6.36 - 0.284\, X_i + 2.54\, S_c - 26\, \Delta n$$

wherein $X_i = [I\,(110)/I\,(100)] \times 100$, $$\Delta n = n_{MD} - n_{TD}$$

wherein

I is the intensity in a wide angle X-ray diffraction, $n_{MD}$ means the refractive index in the machine direction, and $n_{TD}$ means the refractive index in the transverse direction.

This invention further provides a polyester film containing as fine particles at least calcium carbonate particles in the amount of not less than 0.005% by weight, the internal haze H (%), face orientation coefficient $f_n$ and the difference $\Delta n$ between the refractive indices in the machine direction and in the transverse direction satisfying the equation of $$5 \leq 383.3 - 2000\, f_n - 2.76 M + 840\, \Delta n$$

wherein $f_n = [(n_{MD} + N_{TD})/2] - n_{ZD}$ $\Delta n = n_{MD} - n_{TD}$ wherein '$n_{MD}$ is the refractive index in the machine direction, $n_{TD}$ is the refractive index in the transverse direction, and $n_{ZD}$ is the refractive index in the direction of thickness.

The present invention still further provides a polyester film containing as fine particles at least calcium carbonate particles in the amount of not less than 0.005% by weight, which has a center line average roughness Ra of 0.004–0.030 μm, which has a face orientation coefficient $f_n$ of 0.1600–0.1750, which has a difference Δn between the refractive indices in the machine direction and in the transverse direction of −0.055 to −0.025, and which has a F-5 value in the transverse direction of 13–17 kg/mm².

BEST MODE FOR CARRYING OUT THE INVENTION

The first embodiment of the invention is based on the discovery that the slitting property of a polyester film largely depends on the particle size $S_c$ of the polyester crystals, crystal face orientation index $X_i$ and the difference Δn between the refractive indices in the machine direction and the transverse direction, and a polyester film with a good slitting property was obtained by adjusting these three values of physical properties ($X_i$, $S_c$ and Δn) so as to satisfy a specific relationship. The equation defining the specific relationship is:

$$5 \leq -6.36 - 0.284 X_i + 2.54 S_c - 26 \Delta n \ldots 1$$

and the polyester film satisfying this equation has a good slitting property. The crystal face orientation index $X_i$ is defined by the following equation:

$$X_i = [I(110)/I(100)] \times 100,$$

wherein I (110) and I (100) are the intensities in a wide angle X-ray diffraction wherein I (110) is the diffraction intensity at 26.0° corresponding to the diffraction angle of (110) plane of the polyester crystal and I (100) is the diffraction intensity at 22.5° corresponding to the diffraction angle of (100) plane of the polyester crystal.

The diffraction intensities can be measured by setting a sample of laminated polyester films with a thickness of 50 μm in the sample holder of an X-ray diffraction apparatus (e.g., "Geigerflex" manufactured by Rigaku Denki Co., Ltd.) and changing the impinging angle of the X-ray in the plane perpendicular to the machine direction of the film under the following measuring conditions:

Time constant . . . 2 seconds

Sweeping Rate . . . 1 degree/min.

Divergency Slit . . . 1.5 mm diameter,

Scattering slit . . . 1 degree, and X-ray . . . Cu—K α ray from Cu anticathode.

Incidentally, the larger the face orientation, the lower the value of $X_i$.

The particle size $S_c$ (nm) of the polyester crystal (crystal size) is defined by the following equation:

$$S_c = \lambda / [(B-b) \cos \theta]$$

wherein

B is the half value width of the diffraction peak;

b is 0.12;

λ is the wavelength of the K α ray of Cu (0.15418 nm); and

θ is the diffraction angle.

The particle size $S_c$ of the polyester crystals can be calculated by observing the diffraction peak according to the reflection method while changing the angle between the widthwise direction of the film and the impinging direction of the X-ray, and calculating the particle size $S_c$ in the direction of diffracting crystals of the diffraction peak at an impinging angle of about 13° measured by the above-mentioned observation.

The difference Δn between the refractive indices in the machine direction and in the transverse direction is defined by the following equation:

$$\Delta n = n_{MD} - n_{TD}$$

wherein $n_{MD}$ is the refractive index in the machine direction, and $n_{Td}$ is the refractive index in the transverse direction.

The refractive index $n_{MD}$ in the machine direction and the refractive index $n_{TD}$ in the transverse direction can be measured according to JIS K 7105-1981 using an Abbe's refractometer.

Conventional polyesters may be used as the polyester constituting the polyester film of the present invention. Preferred polyesters are those having polyethylene terephthalate units as the major constituent. Those polyesters having ethylene terephthalate units of not less than 95 mol% are especially preferred in view of the mechanical and thermal characteristics. A diol component other than ethylene glycol (e.g., diethylene glycol, triethylene glycol and the like) and a dicarboxylic acid component other than terephthalic acid (e.g., 2,6-naphthalene dicarboxylic acid, p-oxyethoxy benzoic acid, isophthalic acid and azipic acid) may be copolymerized in the amount not adversely affecting the advantageous effects of the present invention. Further, a polyester other than polyethylene terephthalate or a polymer other than polyester may be blended in the amount not adversely affecting the advantageous effects of the present invention.

"Fine particles" are those conventionally used in the polyester films and include particles which are chemically inert to the polyester (so called inert incorporated particles) and particles originating from the catalyst residue, which are generated in polymerization step (so called internal particles).

The polyester film of the present invention contains at least 0.005% by weight of fine calcium carbonate particles. Calcium carbonate particles are necessary for obtaining the satisfactory slipping property (spooling property of the film and the running property of the magnetic tape). The calcium carbonate particles preferably have an average particle size of 0.3–2.0 μm, more preferably 0.5–1.5 μm. This range of the average particle size is preferred because a good slipping property, spooling property of the film and running property of the magnetic tape may be obtained, and good shaving property may be obtained, i.e., the generation of abradings at the roll and the guide may be reduced. The calcium carbonate particles are particles chemically inert to the polyester and belong to the so called inert incorporated particles. The polyester film of the present invention may contain particles originating from the catalyst residue, which are generated in the polymerization step of the polyester (so called internal particles) together with the calcium carbonate particles, as well as incorporated inert particles other than calcium carbonate particles, in an amount not adversely affecting the advantageous effects of the present invention. Examples of the inert incorporated particles may include silicon dioxide and titanium dioxide. Examples of the internal particles include those containing lithium, calcium or phosphorus, more particularly, those containing 0.03–5% by weight of lithium, 0.03–5% by weight of calcium or 0.03–10% by weight of phosphorus. The internal particles preferably have an average particle size of 0.1–3.0 μm, more preferably 0.2–1.0 μm. This range of average particle size is preferred because a good slipping property, spooling property of the film and running property of the magnetic tape may be obtained, and a good shaving property may be obtained, i.e., the generation of abradings at the roll and the guide may be reduced. The preferred range of the content of the calcium carbonate particles varies depending on whether the film contains internal particles or inert incorporated particles other than calcium carbonate particles. In cases where the film does not contain internal particles or inert incorporated particles other than calcium carbonate particles, the preferred content of the calcium carbonate particles is 0.005–1.0% by weight, more preferably 0.10–0.50% by weight. In cases where the film contains internal particles or inert incorporated particles other than calcium carbonate particles, the preferred content of the calcium carbonate particles is 0.005–0.50% by weight, more preferably 0.01–0.15% by weight. In this case, the total content of the inert incorporated particles (including calcium carbonate particles) and internal particles is preferably 0.01–1.0% by weight, more preferably 0.1–0.5% by weight. This range of the content of the particles is preferred because a good slipping property, spooling property of the film and running property of the magnetic tape may be obtained, and a good shaving property may be obtained, i.e., the generation of abradings at the roll and the guide may be reduced.

The content of the particles in the polyester film may be measured as follows: The polyester film is sufficiently washed with methanol to remove matter attached to the surface of the film, then washed with water and dried. To the 300 g of resulting film, 2.7 kg of o-chlorophenol is added and the mixture is heated to 100° C. under stirring and is kept at this temperature to dissolve the polyester component. If the polyester is not dissolved, for example, in cases where the polyester is highly crystallized, the film is once fused and then rapidly cooled, and the above-described dissolving operation is performed. To remove crude undissolved matter other than the internal particles and inert incorporated particles, such as dusts contained in the film and reinforcing material added to the film, the obtained solution is filtered through a G-1 glass filter, and the weight of the removed mass by this filtration is subtracted from the sample weight. To ultracentrifuge type 40P manufactured by Hitachi Ltd., the rotor RP30 is mounted, and 30 cm$^3$ of the solution after the filtration through the glass filter is poured into each cell. After the rotor is rotated to 4,500 rpm to confirm that the rotor revolves without abnormality, the rotor is evacuated and the revolution rate is increased to 30,000 rpm to conduct the ultracentrifugation at this revolution rate. The separation is completed in about 40 minutes. If necessary, the completion of the separation can be confirmed by measuring the light transmittance of the supernatant at 375 nm to check whether a certain value of the light transmittance which is higher than that of the solution before centrifugation is achieved. After the separation, the supernatant is removed by decantation to obtain the separated particles. Since the separated particles may be contaminated with polyester component due to the insufficiency of the separation, o-chlorophenol is added to the obtained particles to uniformly suspend the same, and the ultracentrifuge is repeated. It is necessary to repeat this operation until the melting peak corresponding to a polymer in the scanning differential thermal analysis is not detected, after drying the separated particles as mentioned below. Last, the thus obtained particles are dried at 120° C. for 16 hours in vacuum, and the resulting particles are weighed. The thus obtained separated particles include both the inert incorporated particles and internal particles. Thus, it is necessary to separately determine the content of the inert incorporated particles and the content of the internal particles. To conduct this, the metal component in the particles is quantitatively analyzed and the content of Ca and Li, as well as the content of the metal other than Ca and Li is determined. Then the separated particles are heated to reflux in three times in a mole of ethylene glycol for at least 6 hours. The ethylene glycol is distilled off at a temperature of not lower than 200° C. to achieve depolymerization. By this operation, internal particles alone are dissolved. The remaining particles are dried and weighed, and this weight is defined as the weight of the inert incorporated particles. The difference between the initial weight of the particles and the weight of the inert incorporated particles is defined as the weight of the internal particles. The completion of the depolymerization can be confirmed by conducting the quantitative analysis of the metal component for the separated particles after the depolymerization. By repeating these operations, the accuracy of the measurement of the particles can be promoted.

The average particle size of the internal particles may be measured as follows: Twenty milligrams of sample is sandwiched between a pair of plates heated to 270° C. and the sample is melt-pressed. The internal particles in the thus treated sample are observed with a microscope to which a shield plate is inserted, which has an ocular of 10 magnification and an objective of 10 magnification. The longer diameters of the internal particles are measured using a scale and the average of three plates is obtained. This average diameter is defined as the average particle size of the internal particles.

The present inventors have intensively studied for attaining improvement of the slitting property from another point of view to find that the slitting property of a polyester film can be, when the internal haze is focused, evaluated using the following relationship of Equation 2. Especially, it is preferred to apply Equation 2 for polyester films having relatively large internal haze (e.g., polyester films with internal haze of not less than 2%). However, this does not negate the application of Equation 1 or the effect of the first invention. That is, if the values of internal haze of the polyester films are identical, the polyester film satisfying Equation 1 has a better slitting property than the polyester film not satisfying the Equation 1. Further, for polyester films with relatively small internal haze (for example, polyester films with an internal haze of less than 2%), it is preferred to apply Equation 1.

Equation 2 employed in the second invention is as follows:

$$5 \leq 383.3 - 2000f_n - 2.76H + 840\Delta n \ldots 2$$

Here, H is the internal haze (in terms of %), $f_n$ is the orientation coefficient and $\Delta n$ is the difference between the refractive indices in the machine direction and transverse direction.

The internal haze is the difference between the total haze of a film and the haze resulting from the roughness of the film surface (surface haze). The internal haze H can be calculated from the measured diffusion transmittance and the total light transmittance in accordance with JIS K 7105-1981.

The face orientation coefficient $f_n$ is defined as follows:

$$f_n = [(n_{MD} + n_{TD})/2] - n_{ZD}$$

wherein $n_{MD}$ is the refractive index in the machine direction, $n_{TD}$ is the refractive index in the transverse direction and $n_{ZD}$ is the refractive index in the direction of thickness of the film.

The refractive index $n_{ZD}$ in the direction of thickness of the film may be measured in the same manner as the refractive index $n_{MD}$ in the machine direction and the refractive index $n_{TD}$ in the transverse direction in accordance with JIS K 7105-1981 using an Abbe's refractometer.

As the polyester and the calcium carbonate particles employed in the present embodiment of the invention, the polyester and the calcium carbonate particles employed in the first embodiment of the invention may be employed.

The third embodiment of the invention provides a polyester film containing not less than 0.005% by weight of fine calcium carbonate particles, which has a center line average roughness Ra of 0.004–0.030 μm, which has a face orientation coefficient $f_n$ of 0.1600–0.1750, which has a difference $\Delta n$ between the refractive index in the machine direction and in the transverse direction of −0.055 to −0.025, and which has a F-5 value in the transverse direction of 13–17 kg/mm$^2$.

The polyester film of the third embodiment of the invention has a good slitting property and good slipping property, as well as a good shaving property.

In order to provide a good shaving property in addition to the good slitting property and good slipping property, it is required that the center line average roughness Ra, face orientation coefficient $f_n$, the difference between the refractive indices $\Delta n$ in the machine direction and in the transverse direction, and the F-5 value in a transverse direction be in the specific range, respectively. In particular, although the face orientation coefficient $f_n$ and the difference $\Delta n$ between the machine direction and in the transverse direction largely influence the slitting property, to obtain a good shaving property, it is required that center line average roughness Ra and the F-5 value in the transverse direction (hereinafter referred to as "F5$_{TD}$") be in a specific range in addition to the requirement that $f_n$ and $\Delta n$ be in the specific range.

In the third embodiment of the invention, the center line average roughness Ra of the surface of the film is 0.004–0.030 μm, preferably 0.006–0.028 μm. The center line surface roughness Ra is measured with a touching needle type surface roughness meter (SE-3C manufactured by Kosaka Kenkyusho) at a cut-off value of 0.25 mm in accordance with DIN 4768.

The face orientation coefficient $f_n$ is 0.1600–0.1750, preferably 0.1620–0.1720. The definition of the face orientation coefficient $f_n$, and the method of measuring the same are the same as in the second embodiment of the invention.

The difference $\Delta n$ between the refractive indices in the machine direction and in the transvers direction is −0.055 to −0.025, preferably −0.055 to −0.030. The definition of the difference $\Delta n$ between the refractive indices in the machine direction and transverse direction and the method of measuring the same are the same as in the first and the second embodiments of the inventions.

The F-5 value in the transverse direction is 13–17 kg/mm$^2$, preferably 13.5–16 kg/mm2. The "F-5 value" herein means the stress (kg/mm$^2$) exerted to the film when the film is elongated by 5% by stretching the film with Tensilon or the like. The measurement of F-5 value may be conducted in accordance with ASTM D 882-67.

The polyester and the calcium carbonate particles employed in the first and the second embodiments of the invention may also be employed in the third invention.

In the third embodiment of the invention, it is preferred to employ silicon dioxide together with calcium carbonate because the shaving property is further promoted. In this case, the preferred average particle size (median value of the volume-based particle size) of the silicon dioxide is 0.3–1.5 μm, and the preferred content thereof is 0.005–0.10% by weight.

The polyester film of the present invention may be, for example, manufactured as follows:

Using terephthalic acid as the acid component and ethylene glycol as the glycol component, polymerization is performed in the conventional manner after adding the calcium carbonate particles and, if necessary, silicon dioxide particles to obtain a polyester. In cases where the internal particles are to be formed, it is preferred to use calcium acetate, lithium acetate, antimony oxide or trimethyl phosphate as a polymerization catalyst. The method of forming the internal particles is not restricted to this method, and the typical examples of the method of forming internal particles are described in U.S. Pat. Nos. 4,067,855 and 4,138,386. The polyester is dried and extruded according to the conventional method to obtain a non-oriented sheet. The non-oriented sheet is then stretched in the machine direction to 3.0–5.5 times the original length at a temperature of 90°–135° C. in the first stretching step in the machine direction, and then stretched in the transverse direction to 3.0–4.0 times the original length in a first tenter at a temperature of 90°–135° C. The resulting film is further stretched in the transverse direction in a second tenter to 1.1–1.3 times the original length at a temperature of 180°–230° C., and the resulting film is thermally fixed at a temperature of 180°–230° C. allowing the relaxation of 2–6%. Although the process of producing the polyester film of the present invention is not restricted to the process described above, it is preferred to conduct the stretching in the transverse direction in at least two steps including the step of re-stretching with a stretching ratio of 1.1–1.3 times the original length at a temperature of 180°–230° C. Since the physical properties of the obtained polyester film ($S_c$, $X_i$, $\Delta n$, H, $f_n$, Ra and $F5_{TD}$) are influenced by the conditions in the steps of forming the film such as the stretching temperature and the stretching ratio, the manufacturing conditions are adjusted appropriately based on the following description:

In general, the larger the degree of face orientation or the larger the degree of heat crystallization, the larger the particle size $S_c$ of the polyester crystals. Therefore, by increasing the area stretching ratio in the step of stretching to promote face orientation, $S_c$ can be made large, and conversely, by reducing the area stretching ratio, $S_c$ can be made small. Further, by employing a higher temperature in the heat treatments in the manufacturing steps to promote the crystallization, $S_c$ can be made large, and conversely, by employing a lower temperature in the heat treatments in the manufacturing process, $S_c$ can be made small. In the first embodiment of the invention, although the Equation 1 is satisfied by adjusting the three physical properties, $S_c$, $X_i$ and $\Delta n$, if only $S_c$ is taken into consideration, the Equation 1 can be satisfied by increasing the particle size $S_c$ of the polyester crystals.

The crystal face orientation index $X_i$ can be lowered by increasing the area stretching ratio in the stretching steps, and can be raised by decreasing the area stretching ratio. This does not correlate with the stretching ratio in the machine direction alone or the stretching ratio in the transverse direction alone. Further, under the same area stretching ratios, $X_i$ can be lowered by performing the stretching steps at a lower temperature and can be increased by performing the stretching steps at a higher temperature. If only $X_i$ is taken into consideration, Equation 1 can be satisfied by lowering $X_i$.

The difference $\Delta n$ between the refractive indices in the machine direction and in the transverse direction can be increased by raising $n_{MD}$ and lowering $n_{TD}$, and can be lowered by conducting the opposite. The $n_{MD}$ can be raised by increasing the stretching ratio in the machine direction, and can be lowered by decreasing it. The $n_{TD}$ can be lowered by decreasing the stretching ratio in the transverse direction and can be raised by increasing it. Further, $n_{MD}$ can be raised by lowering the temperature in the stretching step in the machine direction and can be lowered by raising it. The $n_{TD}$ can be lowered by raising the temperature in the stretching step in the transverse direction and can be raised by lowering it. If $\Delta n$ alone is taken into consideration, Equations 1 and 2 can be satisfied by decreasing the $\Delta n$.

The internal haze H can be increased by increasing the number of the particles contained in the film (incorporated calcium carbonate particles and internal particles), and can be decreased by decreasing it. Further, the internal haze H can be adjusted more or less by selecting the stretching method when stretching the non-oriented sheet. If the internal haze H alone is taken into consideration, Equation 1 can be satisfied by increasing the internal haze H.

The face orientation coefficient $f_n$ can be increased by increasing the area stretching ratio in the stretching steps and can be decreased by decreasing it. This does not correlate with the stretching ratio in the machine direction alone or the stretching ratio in the transverse direction alone. Further, under the same area stretching ratios, face orientation coefficient $f_n$ can be increased by performing the stretching steps at a lower temperature and can be decreased by performing the stretching steps at a higher temperature. If only $f_n$ is taken into consideration, Equation 2 can be satisfied by increasing $f_n$.

The F-5 value in the transverse direction can be increased by increasing the stretching ratio in the transverse direction and can be decreased by decreasing it.

The present invention will now be described based on the examples thereof. However, it should be noted that the present invention is not restricted to the examples thereof.

Seven kinds of polyester films were manufactured (samples 1-7) under various manufacturing conditions. The values of the physical properties ($S_c$, $X_i$, $\Delta n$) of each sample were determined and the slitting property and the slipping property were evaluated. The results are shown in Table 1. The evaluation methods of the slitting property and the slipping property, and the manufacturing process of each polyester film were as follows:

First Method of Evaluating Slitting Property

After slitting a sample, the resulting strips were laminated. The number of the whiskers on the cut faces were counted using an optical microscope at 50 magnification, and the slitting property was rated in accordance with the criteria shown in the table below. The greater the parameter y of the slitting property, the better the slitting property. Incidentally, the mark ◉ in the column of the evaluation means excellent ○ good, Δ means ordinary and X means bad.

| Slitting Property Parameter y | Number of Whiskers on Cut Faces | Evaluation |
| --- | --- | --- |
| 6 | 11 or less | ◉ |
| 5 | 12-15 | ○ |
| 4 | 16-19 | ○ ~ Δ |
| 3 | 20-25 | Δ |
| 2 | 26-30 | Δ ~ X |
| 1 | 31 or more | X |

Second Method of Evaluating Slitting Property

Figure 2:
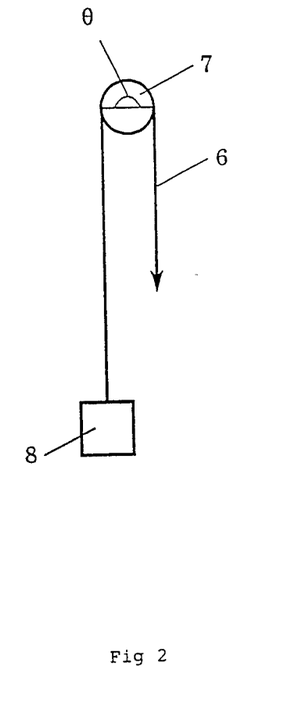
FIG. 2 is a schematic view of an apparatus used in the evaluation of the slipping property in the examples of the present invention.

The film was slitted to a width of ½ inch and as shown in FIG. 2, the slitted film 6 was made to contact a metal guide pin 7 such that the winding angle $\theta$ was $\pi$ (rad). On one end of the film, a weight 8 of $T_1$ (g) was loaded, and the tension $T_2$ exerted by withdrawing the other end was measured. The coefficient of friction $\mu_k$ with the metal guide pin is given by the following equation:

$$\mu_k = (1/\theta)\ln(T_1/T_2)$$

The $\mu_k$ values obtained by applying the above equation were rated in accordance with the following table. Those rated to rank 3 or better rank are satisfactory (without disadvantages) as a magnetic tape.

| Rank of Slitting Property | Coefficient of Friction |
| --- | --- |
| 1 | 0.45 or more |
| 2 | 0.40 or more and less than 0.45 |
| 3 | 0.35 or more and less than 0.40 |
| 4 | 0.30 or more and less than 0.35 |
| 5 | less than 0.30 |

(Sample 1)

Figure 1:
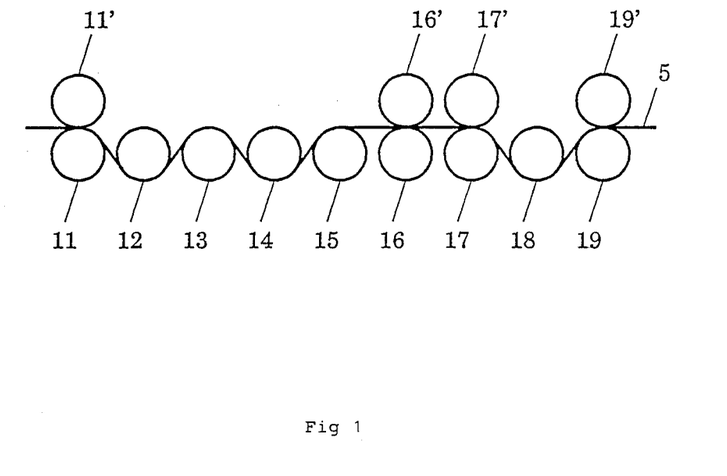
FIG. 1 is a schematic view of a machine direction stretching apparatus used in a manufacturing step of the polyester films of the examples of the present invention.

To dimethyl terephthalate and ethylene glycol, were added 0.08% by weight of calcium acetate, 0.15% by weight of lithium acetate, 0.04% by weight of antimony oxide, 0.15% by weight of trimethyl phosphate and 0.03% by weight of calcium carbonate with an average particle size of 1.1 μm, and the mixture was subjected to polycondensation in accordance with the conventional method to obtain a polyester containing 0.20% by weight of internal particles with an average particle size of 0.6 μm and 0.03% by weight of calcium carbonate particles as inert incorporated particles, which had an intrinsic viscosity of 0.62. The polyester was dried and extruded according to the conventional method to obtain a non-oriented sheet. The non-oriented sheet was penetrated through a group of rolls 11-19, 11', 16', 17' and 19' as shown in FIG. 1 to stretch the sheet in the machine direction. In FIG. 1, the polyester film stretched in the machine direction is indicated by the reference numeral 5. The temperature of the rolls 11 and 12 was 78° C., that of the rolls 13 and 14 was 120° C., that of the roll 15 was 125° C., that of the roll 16 was 125° C. and that of the roll 17 was 114° C. The stretching was conducted with a stretching ratio of 1.1 times the original length between rolls 15 and 16, 1.21 times the original length between the 16-17, and 2.4 times the original length between the rolls 17 and 18. Then the film was stretched in a first tenter in the transverse direction with a stretching ratio of 3.7 times the original length under hot wind with a temprature of 110° C. Thereafter, the film was introduced into a second tenter and was thermally fixed at 205° C. while allowing 3.3% of relaxation under hot wind with a temperature of 205° C. to obtain a polyester film.

(Sample 2)

A polyester film was produced in the same manner as in Sample 1 except that the temerature of the rolls 15, 16 and 17 was 128° C., 128° C. and 115° C. respectively, and the stretching ratio in the transverse direction in the second tenter was 1.15 times the original length.

(Sample 3)

A polyester film was produced in the same manner as in Sample 1 except that 0.035% by weight of calcium carbonate was used.

(Sample 4)

A polyester film was produced in the same manner as in Sample 1 except that 0.04% by weight of calcium carbonate was used and the film was stretched to 2.0 times the original length between the rolls 17 and 18.

(Sample 5)

A polyester film was produced in the same manner as in Sample 1 except that the temperature of the rolls 13 and 14 was 123° C. and the film was stretched to 2.0 times the original length between the rolls 17 and 18.

(Sample 6)

A polyester film was produced in the same manner as in Sample 1 except that stretching was performed in the transverse direction in the second tenter with a stretching ratio of 1.05 times the original length.

(Sample 7)

A polyester film was produced in the same manner as in Sample 1 except that 0.15% by weight of calcium carbonate was used, the film was stretched to 2.0 times the original length between the rolls 17 and 18, and the film was stretched in the second tenter in the transverse direction to 1.05 times the original length.

TABLE 1

| Sample No. | $S_c$ (nm) | $X_1$ | $\Delta n$ | Satisfaction of Equation 1 | Evaluation of slitting Property | Rank of slipping Property |
|---|---|---|---|---|---|---|
| 1 | 4.39 | 12.5 | −0.0074 | No | × | 3 |
| 2 | 5.11 | 8.1 | −0.531 | Yes | ⊙ | 3 |
| 3 | 5.23 | 12.5 | −0.0257 | No | △ | 3 |
| 4 | 4.79 | 12.8 | −0.0134 | No | △ | 4 |
| 5 | 4.48 | 15.2 | −0.0112 | No | × | 3 |
| 6 | 4.58 | 15.5 | −0.0115 | No | × | 3 |
| 7 | 5.76 | 8.6 | −0.0240 | Yes | ○ | 4 |

Further, three kinds of polyester films (Sample 8-10) were produced under the different manufacturing conditions. The values of the physical properties (H, $f_n$ and $\Delta n$) of each sample were determined and the slitting property and the slipping property were evaluated. The results are shown in Table 2. The evaluation method of the slitting property, and the manufacturing process of each polyester film were as follows:

(Second Method of Evaluating Slitting Property)

After slitting a sample, the number of the whiskers on the cut faces were counted using an optical microscopy with 200 magnification, and the number of whiskers per 5 cm of the film (longitudinal direction) was calculated. The smaller the number of the whiskers on the cut faces, the better the slitting property.

(Sample 8)

A polyester film was produced in the same manner as in Sample 1 except that 0.08% by weight of calcium carbonate was used and the film was stretched in the transverse direction in the second tenter to 1.20 times the original length.

(Sample 9)

A polyester film was produced in the same manner as in Sample 1 except that 0.05% by weight of calcium carbonate was used and the film was stretched in the transverse direction in the second tenter to 1.20 times the original length.

(Sample 10)

A polyester film was produced in the same manner as in Sample 1 except that 0.04% by weight of calcium carbonate was used and the film was stretched in the transverse direction in the second tenter to 1.15 times the original length.

TABLE 2

| Sample No. | H | $f_n$ | $\Delta n$ | Satisfaction of Equation 2 | Number of Whiskers at Cut Faces | Rank of Slipping Property |
|---|---|---|---|---|---|---|
| 1 | 2.30 | 0.1577 | −0.0074 | No | 70 | 3 |
| 2 | 2.50 | 0.1614 | −0.0531 | Yes | 5 | 3 |
| 3 | 2.34 | 0.1599 | −0.0257 | No | 16 | 3 |
| 4 | 3.32 | 0.1559 | −0.0134 | No | 46 | 4 |
| 5 | 2.71 | 0.1492 | −0.0112 | No | 70 | 3 |
| 6 | 2.34 | 0.1493 | −0.0115 | No | 70 | 3 |
| 7 | 9.66 | 0.1647 | −0.0240 | No | 6 | 4 |
| 8 | 4.79 | 0.1667 | −0.0499 | Yes | 2 | 4 |
| 9 | 3.77 | 0.1652 | −0.0484 | Yes | 2 | 4 |
| 10 | 2.53 | 0.1652 | −0.0428 | No | 8 | 4 |

Further, thirteen kinds of polyester films (Sample 11-23) were produced under the different manufacturing conditions. The values of the physical properties ($R_a$, $\Delta n$, $f_n$ and $F5_{TD}$) of each sample were determined and the slitting property, the slipping property and the shaving property were evaluated. The results are shown in Table 3. The evaluation method of the slitting property and shaving property, and the manufacturing process of each polyester film were as follows:

Third Method of Evaluating Slitting Property

The sample was slitted to a width of ½ inch at a rate of 300 m/min. The number of whiskers at the cut surfaces after the slitting were counted and was expressed in terms of the number of whiskers per 10 cm. The smaller the number of the whiskers, the better the slitting property. The slitting property was rated as follows. The ranks 4 and 5 are acceptable level while the ranks 1–3 are unacceptable level.

| Rank of Slitting Property | Number of Whiskers per 10 cm |
| --- | --- |
| 1 | 71 or more |
| 2 | 31–70 |
| 3 | 11–30 |
| 4 | 5–10 |
| 5 | 4 or less |

(Method of Evaluating Shaving Property)

Figure 3:
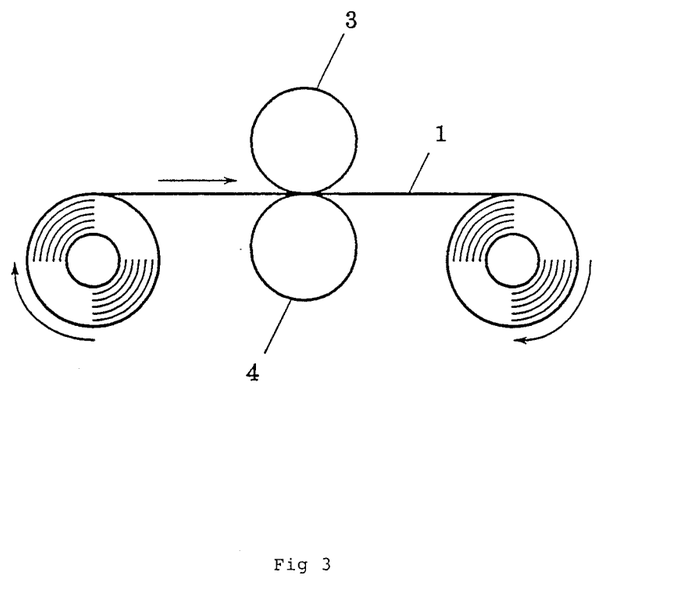
FIG. 3 is a schematic view of an apparatus used in the evaluation of the shaving property in the examples of the present invention.

The produced polyester film was passed through a pair of rolls as shown in FIG. 3 and the shaving of the film was measured. In FIG. 3, reference numeral 1 denotes a polyester film, 3 denotes a metal roll and 4 denotes a calender roll. After running the tape under the following conditions, the abradings attached to the elastic roll was washed with superpure water (containing no particles with a particle size of 3 μm or larger), and the number of the particles with a particle size of 3 μm or more in the washing water was counted using a fine particle counter HIAC/ROYCO. The number of the particles was expressed in terms of the number of particles per a unit area of the film subjected to the running. The smaller the number of the abradings, the better the shaving property. The shaving property was rated in accordance with the following criteria, and the ranks 4 and 5 are acceptable level and the ranks 1–3 are unacceptable level.

Calender Running Conditions

Film Velocity: 300 m/min.
Length of the Film Subjected to Running: 5000 m
Calender Roll Temperature: 80°±3° C.
Calender Pressure: 200 kg/cm

| Rank of Shaving Property | Number of Abradings per m² |
| --- | --- |
| 1 | 201 or more |
| 2 | 151–200 |
| 3 | 101–150 |
| 4 | 51–100 |
| 5 | 50 or less |

(Sample 11)

To dimethyl terephthalate and ethylene glycol, were added 0.08% by weight of calcium acetate, 0.15% by weight of lithium acetate, 0.04% by weight of antimony oxide, 0.15% by weight of trimethyl phosphate and 0.05% by weight of calcium carbonate with an average particle size of 0.8 μm, and the mixture was subjected to polycondensation in accordance with the conventional method to obtain a polyester containing 0.20% by weight of internal particles with an average particle size of 0.6 μm and 0.05% by weight of calcium carbonate particles as inert incorporated particles, which has an intrinsic viscosity of 0.62. The polyester was dried and extruded according to the conventional method to obtain a non-oriented sheet. The thus obtained non-oriented sheet was stretched to 5.0 times the original length at 125° C. in the machine direction in the first stretching step in the machine direction, and then the resulting film was stretched in the transverse direction to 3.8 times the original length at 115° C. in the first tenter. Thereafter, the film was introduced into a second tenter and was thermally fixed at 205° C. while allowing 3.3% of relaxation under hot wind with a temperature of 205° C. to obtain a polyester film with a thickness of 15 μm.

(Sample 12)

A polyester film was produced in the same manner as in Sample 11 except that 0.11% by weight of calcium carbonate particles with an average particle size of 1.2 μm was used, the film was stretched to 4.2 times the original length in the machine direction at 128° C. in the first stretching step in the machine direction, the film was stretched to 3.8 times the original length in the transverse direction at 105° C. in the first tenter, and the film was relaxed by 3.3% after the film was stretched in the transverse direction under hot wind with a temperature of 205° C. to 1.18 times the original length in the second tenter.

(Sample 13)

A polyester film was produced in the same manner as in Sample 11 except that 0.03% by weight of calcium carbonate particles with an average particle size of 1.2 μm was used, the film was stretched to 4.0 times the original length in the machine direction at 125° C. in the first stretching step in the machine direction, the film was stretched to 3.8 times the original length in the transverse direction at 125° C. in the first tenter, and the film was relaxed by 3.3% after the film was stretched in the transverse direction under hot wind with a temperature of 205° C. to 1.05 times the original length in the second tenter.

(Sample 14)

A polyester film was produced in the same manner as in Sample 11 except that 0.03% by weight of calcium carbonate particles with an average particle size of 1.2 μm and 0.03% by weight of silicon dioxide particles with an average particle size of 0.6 μm were used, the film was stretched to 4.5 times the original length in the machine direction at 129° C. in the first stretching step in the machine direction, the film was stretched to 3.8 times the original length in the transverse direction at 105° C. in the first tenter, and the film was relaxed by 3.3% after the film was stretched in the transverse direction under hot wind with a temperature of 205° C. to 1.15 times the original length in the second tenter.

(Sample 15)

A polyester film was produced in the same manner as in Sample 11 except that 0.02% by weight of calcium carbonate particles with an average particle size of 1.6 μm and 0.03% by weight of silicon dioxide particles with an average particle size of 0.6 μm were used, the film was stretched to 4.5 times the original length in the machine direction at 129° C. in the first stretching step in the machine direction, the film was stretched to 3.8 times the original length in the transverse direction at 105° C. in the first tenter, and the film was relaxed by 3.3% after the film was stretched in the transverse direction under hot wind with a temperature of 205° C. to 1.16 times the original length in the second tenter.

(Sample 16)

A polyester film was produced in the same manner as in Sample 11 except that 0.03% by weight of calcium carbonate particles with an average particle size of 1.5 μm was used, the film was stretched to 5.0 times the original length in the machine direction at 130° C. in the first stretching step in the machine direction, and the film was stretched to 3.8 times the original length in the transverse direction at 125° C. in the first tenter.

(Sample 17)

A polyester film was produced in the same manner as in Sample 11 except that 0.15% by weight of calcium carbonate particles with an average particle size of 0.8 μm and 0.03% by weight of silicon dioxide particles with an average particle size of 0.6 μm were used, the film was stretched to 4.5 times the original length in the machine direction at 129° C. in the first stretching step in the machine direction, the film was stretched to 3.8 times the original length in the transverse direction at 105° C. in the first tenter, and the film was relaxed by 3.3% after the film was stretched in the transverse direction under hot wind with a temperature of 205° C. to 1.15 times the original length in the second tenter.

(Sample 18)

A polyester film was produced in the same manner as in Sample 11 except that 0.04% by weight of calcium carbonate particles with an average particle size of 1.2 μm was used, the film was stretched to 3.5 times the original length in the machine direction at 120° C. in the first stretching step in the machine direction, the film was stretched to 3.5 times the original length in the transverse direction at 105° C. in the first tenter, and the film was stretched in the machine direction to 1.7 times the original length at 140° C. in the second stretching step in the machine direction.

(Sample 19)

To dimethyl terephthalate and ethylene glycol, were added 0.04% by weight of antimony trioxide, 0.02% by weight of magnesium acetate, 0.01% by weight of calcium carbonate particles with an average particle size of 1.0 μm, and the mixture was subjected to polycondensation in accordance with the conventional method to obtain a polyester with an intrinsic viscosity of 0.60. In the polycondensation step, care was taken to restrict the formation of the internal particles as small as possible. The polyester was dried and extruded according to the conventional method to obtain a non-oriented sheet. The thus obtained non-oriented sheet was stretched to 4.5 times the original length at 123° C. in the machine direction in the first stretching step in the machine direction, and then the resulting film was stretched in the transverse direction to 3.8 times the original length at 105° C. in the first tenter. Thereafter, the film was introduced into a second tenter and was thermally fixed at 205° C. while allowing 3.3% of relaxation under hot wind with a temperature of 205° C. after stretching the film in the transverse direction to 1.16 times the original length under hot wind with a temperature of 205° C. to obtain a polyester film with a thickness of 15 μm.

(Sample 20)

A polyester film was produced in the same manner as in Sample 11 except that 0.11% by weight of calcium carbonate particles with an average particle size of 0.8 μm was used, the film was stretched to 4.2 times the original length in the machine direction at 128° C. in the first stretching step in the machine direction, the film was stretched to 3.8 times the original length in the transverse direction at 105° C. in the first tenter, and the film was relaxed by 3.3% after the film was stretched in the transverse direction under hot wind with a temperature of 205° C. to 1.25 times the original length in the second tenter.

(Sample 21)

To dimethyl terephthalate and ethylene glycol, were added 0.04% by weight of antimony trioxide, 0.02% by weight of magnesium acetate, 0.01% by weight of calcium carbonate particles with an average particle size of 1.0 μm, and the mixture was subjected to polycondensation in accordance with the conventional method to obtain a polyester with an intrinsic viscosity of 0.60. In the polycondensation step, care was taken to restrict the formation of the internal particles as small as possible. The polyester was dried and extruded according to the conventional method to obtain a non-oriented sheet. The thus obtained non-oriented sheet was stretched to 4.5 times the original length at 120° C. in the machine direction in the first stretching step in the machine direction, and then the resulting film was stretched in the transverse direction to 3.8 times the original length at 105° C. in the first tenter. Thereafter, the film was introduced into a second tenter and was thermally fixed at 205° C. while allowing 3.3% of relaxation under hot wind with a temperature of 205° C. to obtain a polyester film with a thickness of 15 μm.

(Sample 22)

A polyester film was produced in the same manner as in Sample 11 except that 0.11% by weight of silicon dioxide particles with an average particle size of 0.8 μm was used, the film was stretched to 4.2 times the original length in the machine direction at 128° C. in the first stretching step in the machine direction, the film was stretched to 3.8 times the original length in the transverse direction at 105° C. in the first tenter, and the film was relaxed by 3.3% after the film was stretched in the transverse direction under hot wind with a temperature of 205° C. to 1.18 times the original length in the second tenter.

(Sample 23)

A polyester film was produced in the same manner as in Sample 12 except that 0.30% by weight of calcium carbonate particles with an average particle size of 0.8 μm were used.

TABLE 3

| Sample No. | Ra (nm) | Δn | $f_n$ | $F5_{TD}$ (kg/mm$^2$) | Rank of Slitting Property | Rank of Slipping Property | Rank of Shaving Property |
|---|---|---|---|---|---|---|---|
| 11 | 28 | 0 | 0.1680 | 11.5 | 1 | 3 | 3 |
| 12 | 24 | −0.050 | 0.1650 | 15.0 | 5 | 4 | 4 |
| 13 | 24 | 0.020 | 0.1580 | 12.0 | 2 | 4 | 2 |
| 14 | 24 | −0.043 | 0.1670 | 14.5 | 5 | 5 | 5 |
| 15 | 26 | −0.045 | 0.1670 | 14.7 | 5 | 4 | 4 |
| 16 | 25 | −0.010 | 0.1590 | 11.0 | 1 | 4 | 2 |
| 17 | 23 | −0.043 | 0.1670 | 14.5 | 5 | 5 | 5 |
| 18 | 28 | +0.045 | 0.1720 | 10.5 | 3 | 4 | 1 |
| 19 | 10 | −0.033 | 0.1700 | 13.2 | 4 | 3 | 4 |
| 20 | 23 | −0.058 | 0.1710 | 17.5 | 4 | 4 | 3 |
| 21 | 11 | +0.005 | 0.1680 | 11.0 | 1 | 3 | 2 |
| 22 | 22 | −0.050 | 0.1652 | 15.0 | 4 | 2 | 3 |
| 23 | 26 | −0.051 | 0.1645 | 15.0 | 4 | 4 | 2 |

INDUSTRIAL APPLICABILITY

The polyester films of the present invention have good slitting property and good slipping property, so that they can be used as a base film of magnetic recording media. They are especially suited to be used as the base film of magnetic tapes.

We claim:

1. A polyester film containing as fine particles at least calcium carbonate particles in an amount of not less than 0.005% by weight, wherein the particle size $S_c$ (nm) of the polyester crystals, the crystal face orientation index $X_i$ and the difference Δn between the refractive indices in the machine direction and in the transverse direction satisfy the following equation $$5 \leq -6.36 - 0.284 X_i + 2.54 S_c - 26 \Delta n$$

wherein, $X_i = \{I(110)/I(100)\} \times 100$, $$n = n_{MD} - n_{TD}$$

wherein
  I is intensity in a wide angle X-ray diffraction,
  $n_{MD}$ is the refractive index in the machine direction, and
  $n_{TD}$ is the refractive index in the transverse direction;
and,
  wherein the polyester film has a center line roughness Ra of 0.004–0.030 μm, a face orientation coefficient $f_n$ of 0.1600–0.1750, a difference Δn of −0.055 to −0.025, and a F-5 value in the transverse direction of 13.5–16 kg/mm$^2$.

2. The polyester film of claim 1, wherein the content of the fine particles is 0.005–1.0% by weight.

3. The polyester film of claim 1, wherein the fine particles include calcium carbonate particles and internal particles.

4. The polyester film of claim 3, wherein the content of the calcium carbonate particles is 0.005–0.50% by weight and the content of the internal particles is 0.005–0.50% by weight.

5. The polyester film of claim 1 or 3, wherein the average particle size of the calcium carbonate particles is 0.3–2.0 μm.

6. The polyester film of claim 3, wherein the average particle size of the internal particles is 0.1–3.0 μm.

7. A polyester film containing as fine particles at least calcium carbonate particles in an amount of not less than 0.005% by weight and internal particles, wherein the internal haze H (%), face orientation coefficient $f_n$ and the difference Δn between the refractive indices in the machine direction and in the transverse direction satisfy the equation $$5 \geq 383.3 - 2000 f_n - 2.76 H + 840 \Delta n$$

wherein $f_n = \{(n_{MD} + n_{TD})/2\} - n_{ZD}$ $$n = n_{MD} - n_{TD}$$

wherein
  $n_{MD}$ is the refractive index in the machine direction,
  $n_{TD}$ is the refractive index in the transverse direction, and
  $n_{ZD}$ is the refractive index in the direction of thickness.

8. The polyester film of claim 7, wherein the content of the fine particles is 0.005–1.0% by weight.

9. The polyester film of claim 7, wherein the content of the calcium carbonate particles is 0.005–0.50% by weight and the content of the internal particles is 0.005–0.05% by weight.

10. The polyester film of claim 7, wherein the average particle size of the calcium carbonate particles is 0.3–2.0 μm.

11. The polyester film of claim 7, wherein the average particle size of the internal particles is 0.1–3.0 μm.

12. The polyester film of claim 1, wherein the fine particles include calcium carbonate particles, silicon dioxide particles and internal particles.

13. The polyester film of claim 12, wherein the content of the calcium carbonate particles is 0.005–0.50% by weight, the content of the silicon dioxide particles is 0.005–0.10% by weight and the content of the internal particles is 0.005–0.40% by weight.

14. The polyester film of claim 12, wherein the average particle size of the calcium carbonate particles is 0.3–2.0 μm.

15. The polyester film of claim 12, wherein the average particle size of the internal particles is 0.1–3.0 μm.

16. The polyester film of claim 12, wherein the average particle size of the silicon dioxide particles is 0.3–1.5 μm.

17. The polyester film of claim 1, wherein the average particle size of the calcium carbonate particles is 0.5–1.5 μm.

18. The polyester film of claim 7, wherein the average particle size of the calcium carbonate particles is 0.5–1.5 μm.

19. The polyester film of claim 3, wherein said internal particles contain 0.03–5% by weight of lithium, 0.03–5% by weight of calcium or 0.03–10% by weight of phosphorus.

20. The polyester film of claim 7, wherein said internal particles contain 0.03–5% by weight of lithium, 0.03–5% by weight of calcium or 0.03–10% by weight of phosphorus.

21. The polyester film of claim 1, wherein the total content of the fine particles is 0.10–0.50% by weight.

22. The polyester film of claim 7, wherein the total content of the fine particles is 0.10–0.50% by weight.

23. The polyester film of claim 1, wherein the total content of the fine particles is 0.01–1.0% by weight.

24. The polyester film of claim 7, wherein the total content of the fine particles is 0.01–1.0% by weight.

25. The polyester film of claim 1, wherein the center line roughness Ra is 0.006–0.028 μm.

26. The polyester film of claim 7, wherein the film has an F-5 value in the transverse direction of 13.5–16 kg/mm².

27. The polyester film of claim 1, wherein the face orientation coefficient $f_n$ is 0.1620–0.1720.

28. The polyester film of claim 7, wherein the face orientation coefficient $f_n$ is 0.1620–0.1720.

29. The polyester film of claim 1, wherein the difference Δn is −0.55 to −0.030.

30. The polyester film of claim 7, wherein the difference Δn is −0.055 to −0.030.

* * * * *